(12) United States Patent
Farrell et al.

(10) Patent No.: US 8,813,083 B2
(45) Date of Patent: Aug. 19, 2014

(54) METHOD AND SYSTEM FOR SAFE ENQUEUING OF EVENTS

(75) Inventors: Robert L. Farrell, Granite Bay, CA (US); Ali-Reza Adl-Tabatabai, San Jose, CA (US); Altug Koker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 13/175,493

(22) Filed: Jul. 1, 2011

(65) Prior Publication Data

US 2013/0007751 A1 Jan. 3, 2013

(51) Int. Cl.
*G06F 9/46* (2006.01)
(52) U.S. Cl.
USPC .......................................... 718/102; 718/103
(58) Field of Classification Search
CPC ........ G06F 9/4881; G06F 9/4843; G06F 9/52
See application file for complete search history.

(56) References Cited

U.S. PATENT DOCUMENTS

| 6,480,200 | B1 * | 11/2002 | Fisher et al. | 345/582 |
| 7,586,493 | B1 | 9/2009 | Sams | |
| 7,810,083 | B2 * | 10/2010 | Chinya et al. | 717/149 |
| 8,521,995 | B2 * | 8/2013 | Yamada et al. | 712/228 |
| 2006/0136874 | A1 | 6/2006 | Berry | |
| 2009/0089794 | A1 | 4/2009 | Hilton | |
| 2011/0154334 | A1 | 6/2011 | Beale | |

OTHER PUBLICATIONS

Microsoft Press Computer Dictionary, third edition, 1997, p. 288.*
PCT International Search Report and Written Opinion issued in corresponding PCT/US2012/044837 dated Jan. 25, 2013 (10 pages).

* cited by examiner

*Primary Examiner* — Van Nguyen
(74) *Attorney, Agent, or Firm* — Trop, Pruner & Hu, P.C.

(57) ABSTRACT

A method and system to facilitate a user level application executing in a first processing unit to enqueue work or task(s) safely for a second processing unit without performing any ring transition. For example, in one embodiment of the invention, the first processing unit executes one or more user level applications, where each user level application has a task to be offloaded to a second processing unit. The first processing unit signals the second processing unit to handle the task from each user level application without performing any ring transition in one embodiment of the invention.

21 Claims, 3 Drawing Sheets

US 8,813,083 B2

METHOD AND SYSTEM FOR SAFE ENQUEUING OF EVENTS

FIELD OF THE INVENTION

This invention relates to a system, and more specifically but not exclusively, to a method and system for safe enqueuing of events for a processing unit by another processing unit without using any ring transitions.

BACKGROUND DESCRIPTION

A system may have multiple processing units or devices. A processing unit may offload a task or event to another processing unit in the system. However, the processing unit is required to make ring transitions to enqueue the task to be offloaded to the other processing unit. For example, in prior art FIG. 1 100, a user level application executing in ring 3 140 has to transition via ring 2 130 and ring 1 120 to the kernel mode in ring 0 110 to enqueue the task to be offloaded to the other processing unit.

BRIEF DESCRIPTION OF THE DRAWINGS

The features and advantages of embodiments of the invention will become apparent from the following detailed description of the subject matter in which.

DETAILED DESCRIPTION

Figure 1:
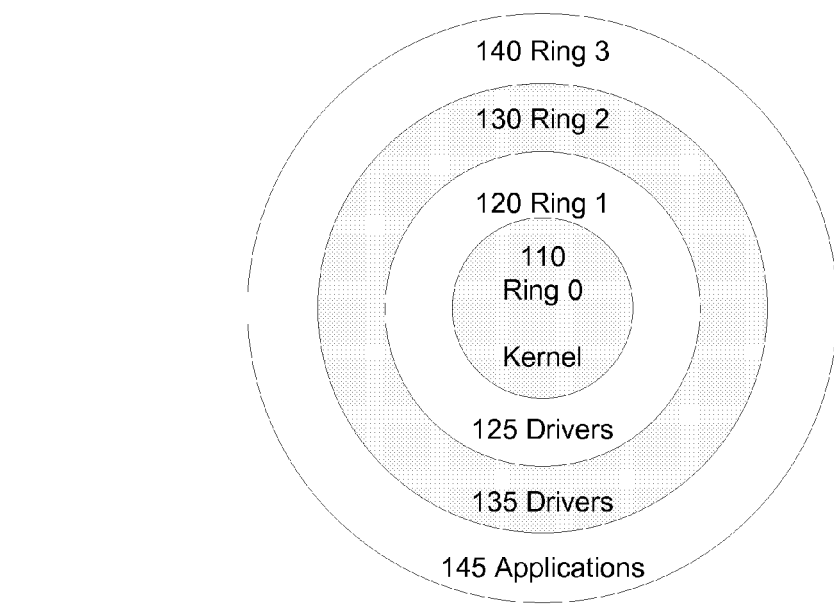
FIG. 1 illustrates a prior art block diagram of the hierarchical protection domains or rings.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to facilitate a user level application executing in a first processing unit to enqueue work or task(s) safely for a second processing unit without performing any ring transition. For example, in one embodiment of the invention, the first processing unit executes one or more user level applications, where each user level application has a task to be offloaded to a second processing unit. The first processing unit signals the second processing unit to handle the task from each user level application without performing any ring transition in one embodiment of the invention.

The first and the second processing units include, but are not limited to, central processing units (CPUs), graphics processing units (GPUs), digital signal processors (DSPs), and any other processing unit. For example, in one embodiment of the invention, the first processing unit is a CPU and the second processing unit is a GPU.

In one embodiment of the invention, a user level software thread executes on the CPU to signal the GPU that it has a task to be offloaded to the GPU without incurring the overhead of a ring transition to the operating system (OS) kernel level. By avoiding the ring transition to the OS kernel level by the CPU, the CPU does not open a security hole while signaling the GPU that it has a task to be offloaded to the GPU in one embodiment of the invention.

Figure 2:
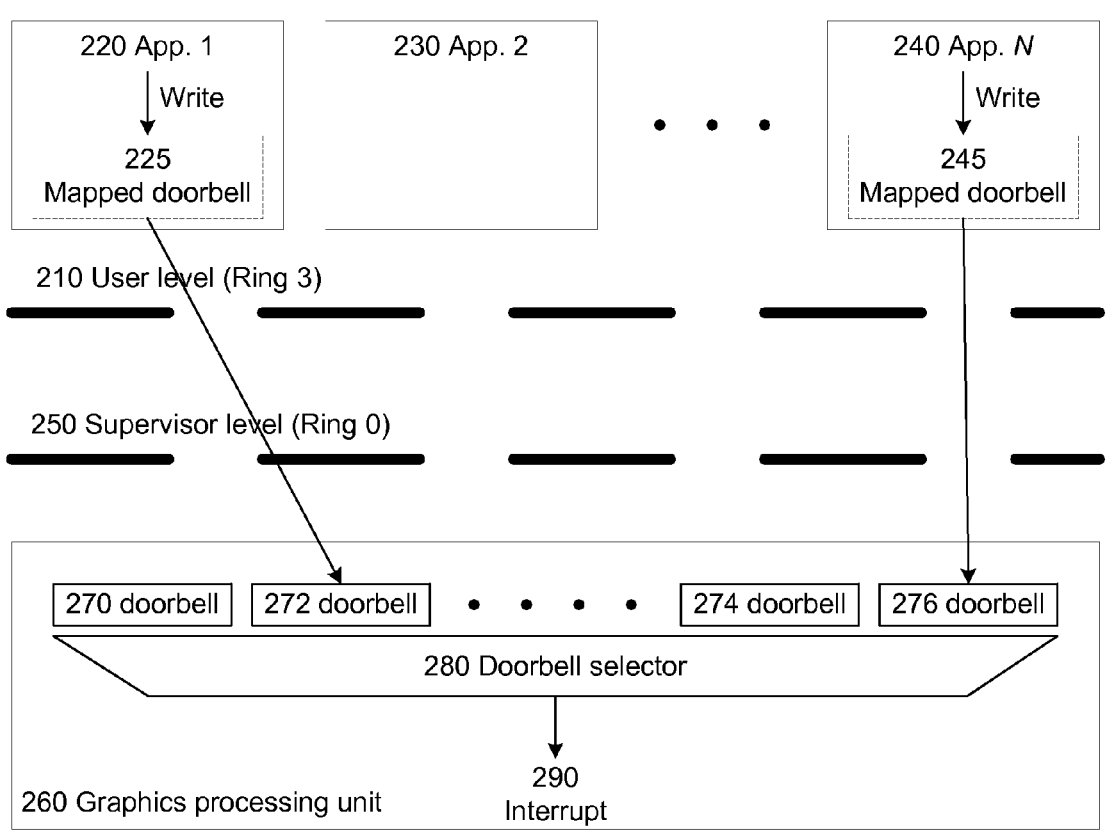
FIG. 2 illustrates a block diagram of safe enqueuing of events in accordance with one embodiment of the invention.

FIG. 2 illustrates a block diagram 200 of safe enqueuing of events in accordance with one embodiment of the invention. For clarity of illustration, FIG. 2 illustrates a CPU that enqueues events to be executed by the GPU 260. Each event indicates work or task to be executed by the GPU 260 in one embodiment of the invention.

In one embodiment of the invention, the CPU has hierarchical protection domains or rings that provide different levels of security access to resources in the system. For example, in one embodiment of the invention, the CPU has a supervisor level or ring 0 250, a user level or ring 3 210, and other rings that are not shown in FIG. 2 for clarity of illustration. One of ordinary skill in the relevant art will readily appreciate the workings of the hierarchical protection rings and it shall not be described herein.

In one embodiment of the invention, the CPU executes one or more user level applications in ring 3 210 as illustrated as application (App.) 1 220, App. 2 230 and App. N 240. The App. N 240 illustrates that there can be any number of user level applications that can be executed on the CPU in one embodiment of the invention.

In one embodiment of the invention, each user level application executing on the CPU has an indicator that indicates that it has a task to be offloaded to the GPU 260. In one embodiment of the invention, the task is offloaded by enqueuing the identification of the task into a queue that is accessible by the GPU 260.

For clarity of illustration, it is assumed that App. 1 220 and App. N 240 each has one or more tasks or work to be offloaded to the GPU 260. In one embodiment of the invention, the App. 1 220 and App. N 240 have a mapped doorbell indicator 225 and mapped doorbell indicator 245 respectively. The mapped doorbell indicator 225 and mapped doorbell indicator 245 are in the virtual address space of the App. 1 220 and App. N 240 respectively in one embodiment of the invention.

In one embodiment of the invention, the GPU 260 has logic to communicate with the CPU. The logic has doorbell indicators 270, 272, 274, and 276 in one embodiment of the invention. Each of the doorbell indicators 270, 272, 274, and 276 is associated with a respective mapped doorbell indicator of the user level applications executing on the CPU.

For example, in one embodiment of the invention, the App 1. 220 writes or sets the mapped doorbell indicator 225 when it has a task to be offloaded to the GPU 260. The mapped doorbell indicator 225 is associated with the doorbell indicator 272 in the GPU 260. When the mapped doorbell indicator 225 is set, the logic of the GPU 260 sets the doorbell indicator 272 in response to the setting of the mapped doorbell indicator 225.

Similarly, in one embodiment of the invention, the App N. 240 writes or sets the mapped doorbell indicator 245 when it has a task to be offloaded to the GPU 260. The mapped doorbell indicator 245 is associated with the doorbell indicator 276 in the GPU 260. When the mapped doorbell indicator 245 is set, the logic of the GPU 260 sets the doorbell indicator 276 in response to the setting of the mapped doorbell indicator 245. The App 2. 230 is assumed not to have any task to be offloaded to the GPU 260 and does not write its mapped doorbell indicator.

The logic in the GPU 260 has a doorbell selector 280 in one embodiment of the invention. The doorbell selector 280 selects one of the doorbell indicators 270, 272, 274, and 276 that have been set. The doorbell indicators 270 and 274 are assumed to be set by other applications that have not been illustrated in FIG. 2 for clarity of illustration. After the selection of one of the doorbell indicators 270, 272, 274, and 276, the doorbell selector 280 generates an interrupt 290 for the GPU 260.

In one embodiment of the invention, the interrupt 290 indicates to the GPU 260 that there is a task associated with the selected doorbell indicator to be executed and the GPU 260 proceeds to handle the task. For example, in one embodiment of the invention, the door selector 280 selects the doorbell 272 and generates the interrupt 290 to notify the GPU 260. In one embodiment of the invention, the identification of the App. 1 220 is written into a register to allow the GPU 260 to handle the offloaded task from the App. 1 220. The GPU uses the identification of the App. 1 220 to determine which task needs to be executed in one embodiment of the invention.

In one embodiment of the invention, the setting of the selected doorbell is cleared or reset after the identification of the Application associated with the selected doorbell is written into the register. For example, in one embodiment of the invention, the doorbell 272 is cleared or reset after the identification of the App. 1 220 is written into the register and the interrupt 290 has been generated. This enables the doorbell selector 280 to select only doorbells that have been set in one embodiment of the invention.

In one embodiment of the invention, the doorbell selector 280 checks the doorbells using a policy that ensures fairness across the user level processes. This prevents malicious software to cause denial of service attacks in one embodiment of the invention.

For example, in one embodiment of the invention, the doorbell selector 280 selects one doorbell indicator among the doorbell indicators 270, 272, 274, and 276 based on the priority of the doorbell indicators. For example, in one embodiment of the invention, each of the doorbell indicators 270, 272, 274, and 276 is set with a priority level in one embodiment of the invention. The doorbell selector 280 checks the priority level of the doorbell indicators 270, 272, 274, and 276 and selects one doorbell indicator based on the priority level. In one embodiment of the invention, the priority level of the doorbell indicator is based on, but is not limited to, the available resources of the system, completion time, execution time, and any other factors used by the CPU to classify the offloaded tasks.

In another example, in one embodiment of the invention, the doorbell selector 280 selects one doorbell indicator among the doorbell indicators 270, 272, 274, and 276 based on a least recently use criterion. For example, in one embodiment of the invention, the doorbell selector 280 checks which of the doorbell indicators 270, 272, 274, and 276 is the least recently used (LRU) and selects the LRU doorbell indicator.

In other embodiments of the invention, the doorbell selector 280 uses other criterion to ensure a fair selection of the doorbell indicators 270, 272, 274, and 276. One of ordinary skill in the relevant art will readily appreciate how to select the other criterion and these other criterion can be used without affecting the workings of the invention.

The communication between the CPU and the GPU 260 allows asynchronous signaling of tasks that have been enqueued for processing by the GPU 260 in one embodiment of the invention. No ring transition is required for the signaling between the CPU and the GPU 260 and it provides a safe way to signal the GPU 260 without opening up any security holes.

The illustration in FIG. 2 is not meant to be limiting. For example, in another embodiment of the invention, the GPU 260 offloads tasks to the CPU and enqueues the tasks to the CPU. In yet another embodiment of the invention, another type of processing unit besides a CPU and GPU can use the same logic and method to signal a processing unit. In one embodiment of the invention, the doorbell selector 280 and the doorbell indicators 270, 272, 274, and 276 does not have to be part of the GPU 260 and can implemented as logic outside of the GPU 260.

Figure 3:
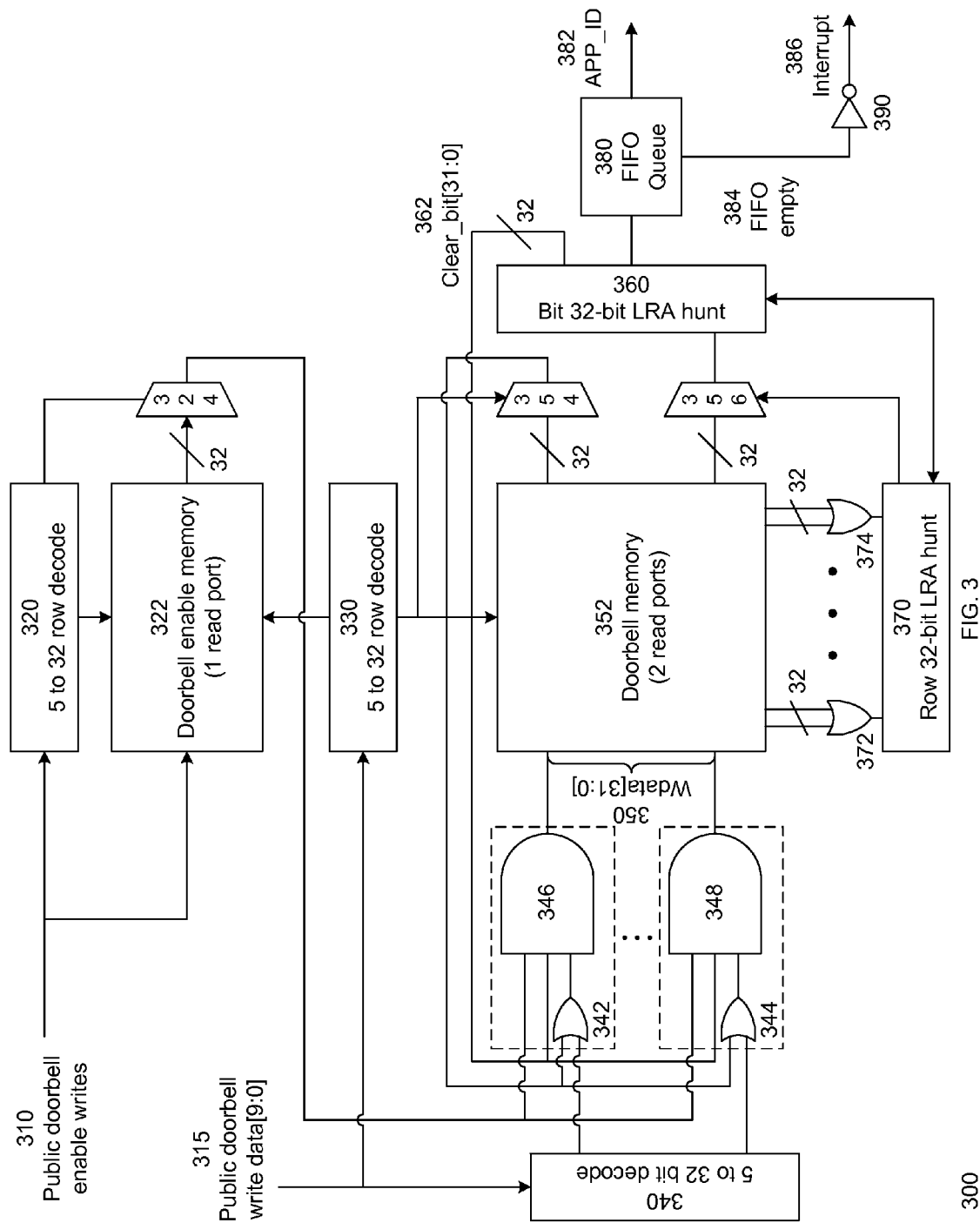
FIG. 3 illustrates a block diagram of safe enqueuing of events in accordance with one embodiment of the invention.

FIG. 3 illustrates a block diagram 300 of safe enqueing of events in accordance with one embodiment of the invention. For clarity of illustration, FIG. 3 is discussed with reference to FIG. 2. The doorbell indicators 270, 272, 274, and 276 are implemented as part of a doorbell array stored in the doorbell memory 352 in one embodiment of the invention. FIG. 3 illustrates the logic for thirty public doorbells in one embodiment of the invention but it is not meant to be limiting. One of ordinary skill in the relevant art will readily appreciate how to apply workings of the invention for other number of public doorbells.

In one embodiment of the invention, when the user level applications write its mapped doorbell indicator, the respective doorbell indicator in the logic of the GPU 260 are set according by using the public doorbell write data [9:0] signals. The public doorbell write data [9:0] signals are connected to a 5 to 32 row decode logic 330 and a 5 to 32 bit decode logic 340.

The 5 to 32 row decode logic 330 and the 5 to 32 bit decode logic 340 are connected with the doorbell memory 352 that has two read ports. In one embodiment of the invention, the doorbell memory 352 stores thirty two 32-bit words that represent an array of thirty two doorbell indicators. The public door write data [9:0] signal uses 5 bits as the row address for the 5 to 32 row decode logic 330 and another 5 bits as the bit address for the 5 to 32 bit decode logic 340.

Each of the doorbell indicators is associated with an application with one or more tasks to be enqueued. During initialization of the application, each application is assigned an application identification (APP_ID) in one embodiment of the invention.

The logic has a corresponding door enable memory 322 associated with each doorbell indicator in the doorbell memory 352. In one embodiment of the invention, the doorbell enable memory 322 stores thirty two 32-bit words. The doorbell enable memory 322 has a respective doorbell enable signal for each of the thirty two doorbell indicators in the doorbell memory 352 in one embodiment of the invention. The doorbell enable memory 322 prevents invalid doorbells from being set by untrusted software in one embodiment of the invention.

The respective doorbell enable signal in the doorbell enable memory 322 is set via the public doorbell enable write signals 310 in one embodiment of the invention. The public doorbell enable write signals 310 has 5 row address signals coupled with the 5 to 32 row decode logic 320 to select the desired row of the doorbell enable memory 322 and the logic writes or stores the desired setting in the selected desired row in one embodiment of the invention.

The doorbell memory 352 has 32 input signals that are illustrated as wdata[31:0] 350 in one embodiment of the invention. Each input signal of the doorbell memory 352 is coupled with an AND gate and an OR gate. For example, in one embodiment of the invention, the wdata[31] signal of the doorbell memory 352 is coupled with an AND gate 346 and an OR gate 342. The wdata[0] signal of the doorbell memory 352 is coupled with an AND gate 348 and an OR gate 344. Each of the other input signal of the doorbell memory 352 is coupled with an AND gate and an OR gate but not are shown in FIG. 3 for clarity of illustration.

The doorbell enable memory 322 is read via a read port 324 that is selected by the 5 to 32 row decode logic 320 in one embodiment of the invention. The output of the read port 324 is coupled with each AND gate of each input signal of the doorbell memory 352. By doing so, the doorbell enable signal associated with each doorbell in the doorbell memory 352 controls the access of each input signal of the doorbell memory 352.

For example, the first input of the AND gate 346 is coupled with the output of the read port 324 in one embodiment of the invention. When a particular doorbell indicator is selected by the 5 to 32 row decode logic 330, the bit setting of the wdata[31] signal can be set only when the output of the read port 324 is asserted or enabled.

The second input of the AND gate 346 is coupled with a respective one of the clear_bit[31:0] signals, i.e., clear_bit [31] signal, from the bit 32-bit least recently accessed (LRA) hunt logic 360. In one embodiment of the invention, the clear_bit[31:0] signals can be set to logic zero to clear the respective setting of the doorbell indicators in the doorbell memory 352. For example, when the clear_bit[31] is set to logic zero, the output of the AND 346 is set to logic zero and it clears the value of the selected doorbell indicator.

The third input of the AND gate 346 is coupled with the output of the OR gate 342 in one embodiment of the invention. The first input of the OR gate 342 is coupled with the output of the read port 1 354 of the doorbell memory 352. The second input of the OR gate 342 is coupled with the output of the 5 to 32 bit decode logic 340. To set a particular doorbell, the public doorbell write data[9:0] provides the row and bit address of the particular doorbell. The 5 to 32 bit decode logic 340 and the 5 to 32 row decode logic 330 decode the public doorbell write data[9:0] accordingly to set the particular doorbell. The workings of the AND gate and OR gate coupled with each of the other inputs of the doorbell memory 352 are similar to the AND gate 346 and the OR gate 342 and shall not be described herein.

In one embodiment of the invention, the doorbell memory 352 is coupled with thirty two 32 to 1 OR gates as illustrated by the OR gates 372 and 374. The output of each of the thirty two 32 to 1 OR gates is coupled to the row 32-bit LRA hunt logic 370. Each OR gate uses the 32 bits of a particular row of the doorbell memory 352 as its input. When one or more bits of a particular row of the doorbell memory 352 are set, the output of the OR gate is asserted.

The row 32-bit LRA hunt logic 370 uses the output of each OR gate to determine whether a particular row of the doorbell memory 352 has been asserted. In one embodiment of the invention, the row 32-bit LRA hunt logic 370 selects the LRA row and sets the read port 0 356 with the address of the LRA row. The output of the read port 0 356 is coupled with the bit 32-bit LRA hunt logic 360. The bit 32-bit LRA hunt logic 360 selects the doorbell bit with the highest priority in the LRA row and enqueues the APP_ID associated with the selected doorbell bit into the first in first out (FIFO) queue 380. The APP_ID 382 is written into a public doorbell vector register that can be accessed by a processing unit to handle the off-loaded task.

The FIFO empty signal 384 is set when the FIFO queue 380 is empty. The interrupt signal 386 is coupled with the FIFO empty signal 384 via an inverter 390. When the FIFO queue 380 is not empty, the FIFO empty signal 384 is de-asserted and the interrupt signal 386 is asserted. The interrupt signal 386 indicates that there is a task to be handled or executed. When the FIFO queue 380 is full, the round-robin arbiter, i.e., the row 32-bit LRA hunt logic 370 and the bit 32-bit LRA hunt logic 360, stops enqueuing tasks to prevent any possible overflow.

In one embodiment of the invention, the doorbell indicators are assigned as part of a Last Level Cache hierarchy which is accessible as a cache client by both the CPU and GPU. When a doorbell page or cache memory line is assigned to GPU, the exclusive ownership of the cache memory line is transferred to GPU. As per the cache coherency protocol (Modified, Exclusive, Shared, Invalid—MESI rules) of an inclusive cache hierarchy, the user level application updating the doorbell cache memory line has to transfer the ownership back to the CPU by invalidating the GPU's ownership. The ownership transfer is used by the GPU as a trigger mechanism to read the contents of the update and determine whether any work or task has been submitted by the user level application.

This mechanism allows a single doorbell to be assigned to one user level application as well as multiple user level applications. In the case of multiple user level applications assigned to a single doorbell indication, each user level application competes to set the doorbell indicator and the successful setting of the doorbell indicator is via atomic operations over the cacheable memory space.

Figure 4A:
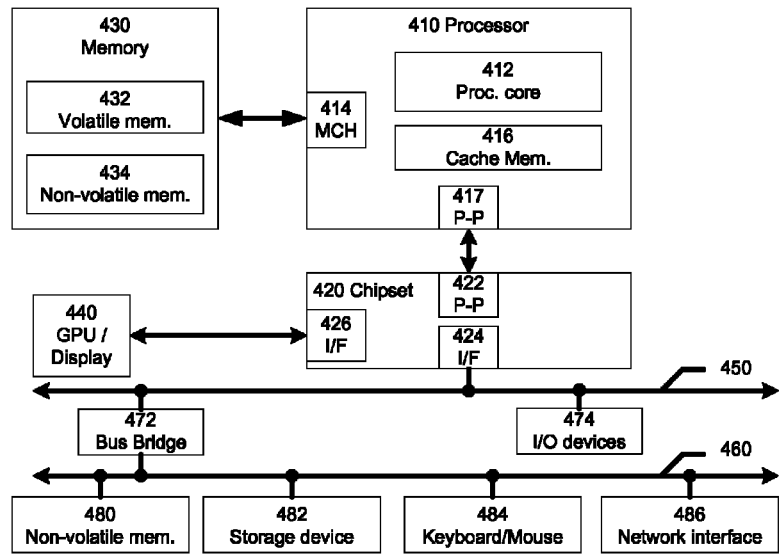
FIG. 4A illustrates a system to implement the methods disclosed herein in accordance with one embodiment of the invention.

FIG. 4A illustrates a system 400 to implement the methods disclosed herein in accordance with one embodiment of the invention. The system 400 includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the system 400 used to implement the methods disclosed herein may be a system on a chip (SOC) system.

The processor 410 has a processing core 412 to execute instructions of the system 400. The processing core 412 includes, but is not limited to, pre-fetch logic to fetch instructions, decode logic to decode the instructions, execution logic to execute instructions and the like. The processor 410 has a cache memory 416 to cache instructions and/or data of the system 400. In another embodiment of the invention, the cache memory 416 includes, but is not limited to, level one, level two and level three, cache memory or any other configuration of the cache memory within the processor 410.

The memory control hub (MCH) 414 performs functions that enable the processor 410 to access and communicate with a memory 430 that includes a volatile memory 432 and/or a non-volatile memory 434. The volatile memory 432 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 434 includes, but is not limited to, NAND flash memory, phase change memory (PCM), read only memory (ROM), electrically erasable programmable read only memory (EEPROM), or any other type of non-volatile memory device.

The memory 430 stores information and instructions to be executed by the processor 410. The memory 430 may also stores temporary variables or other intermediate information while the processor 410 is executing instructions. The chipset 420 connects with the processor 410 via Point-to-Point (PtP) interfaces 417 and 422. The chipset 420 enables the processor 410 to connect to other modules in the system 400. In one embodiment of the invention, the interfaces 417 and 422 operate in accordance with a PtP communication protocol such as the Intel® QuickPath Interconnect (QPI) or the like. The chipset 420 connects to a GPU or a display device 440 that includes, but is not limited to, liquid crystal display (LCD), cathode ray tube (CRT) display, or any other form of visual display device.

In addition, the chipset 420 connects to one or more buses 450 and 460 that interconnect the various modules 474, 480, 482, 484, and 486. Buses 450 and 460 may be interconnected together via a bus bridge 472 if there is a mismatch in bus speed or communication protocol. The chipset 420 couples with, but is not limited to, a non-volatile memory 480, a mass storage device(s) 482, a keyboard/mouse 484 and a network interface 486. The mass storage device 482 includes, but is not limited to, a solid state drive, a hard disk drive, an universal serial bus flash memory drive, or any other form of computer data storage medium. The network interface 486 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 4 are depicted as separate blocks within the system 400, the functions performed by some of these blocks may be integrated within a single semiconductor circuit or may be implemented using two or more separate integrated circuits. The system 400 may include more than one processor/processing core in another embodiment of the invention.

Figure 4B:
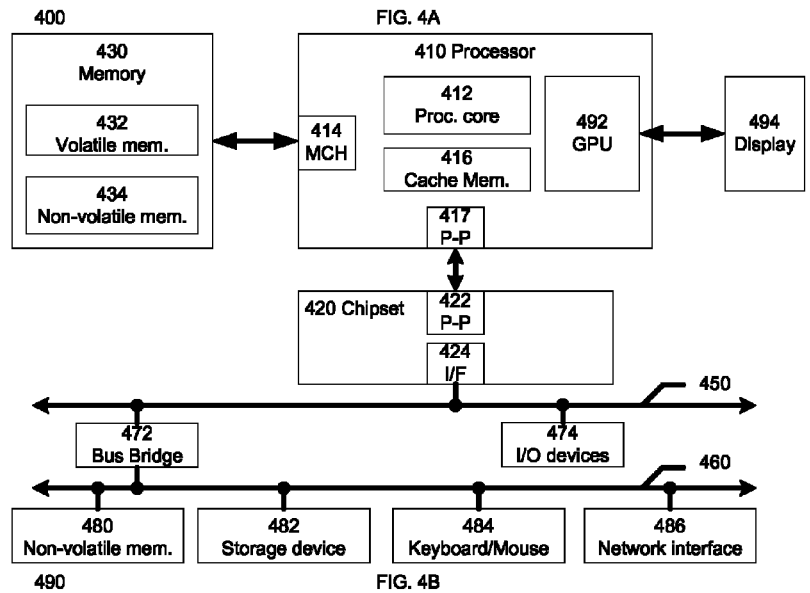
FIG. 4B illustrates a system to implement the methods disclosed herein in accordance with one embodiment of the invention.

FIG. 4B illustrates a system 490 to implement the methods disclosed herein in accordance with one embodiment of the invention. The system 490 is a variation of the system 400 where the GPU 492 is integrated with the processor 410. The GPU 492 is coupled to the display 494 in one embodiment of the invention. The other components in the system 490 are similar to the components in the system 400 and shall not be described herein.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
   a first processing unit to:
   execute one or more user level applications, wherein each user level application is to offload a task to a second processing unit wherein each user level application has a first indicator,
   signal the second processing unit to handle the task from each user level application without performing any ring transition by setting the first indicator of each user level application in response to each user level application having the task to be offloaded to the second processing unit;
   set each of a plurality of second indicators based on each corresponding first indicator of each user level application;
   select one of the plurality of second indicators;
   determine an identification (ID) of the user level application associated with the selected second indicator; and
   store the ID of the user level application into a first in first out (FIFO) queue.

2. The apparatus of claim 1, wherein the first processing unit is further to:
   generate an interrupt for the second processing unit, wherein the interrupt is to indicate that the FIFO queue is not empty.

3. The apparatus of claim 2, wherein the first processing unit is further to:
   clear the selected second indicator in response to storing the ID of the user level application into the FIFO queue.

4. The apparatus of claim 1, wherein the first processing unit to select one of the plurality of second indicators is to select one of the plurality of second indicators based on a priority of the plurality of second indicators.

5. The apparatus of claim 1, wherein the first processing unit to select one of the plurality of second indicators is to select one of the plurality of second indicators based on a least recently use (LSU) criterion.

6. The apparatus of claim 1, wherein the first processing unit is further to assert an enable signal associated with the selected second indicator, and wherein the first processing unit to select one of the plurality of second indicators is to select one of the plurality of second indicators in response to the assertion of the enable signal associated with the selected second indicator.

7. The apparatus of claim 1, wherein the first processing unit is a central processing unit, and wherein the second processing unit is a graphics processing unit.

8. The apparatus of claim 1, wherein the plurality of second indicators are public doorbells, wherein each first indicator is a mapped doorbell in a virtual address space of each user level application associated with each respective public doorbell.

9. The apparatus of claim 8, wherein the public doorbells are part of a last level cache memory hierarchy accessible as a cache memory client by the first and the second processing unit.

10. The apparatus of claim 1, wherein the first processing unit to signal the second processing unit to handle the task from each user level application without performing any ring transition is to signal the second processing unit to handle the task from each user level application while maintaining a privilege level of each user level application.

11. An apparatus comprising:
a first processing unit to:
execute one or more user level threads to enqueue an event for a second processing unit wherein each user level thread has first indicator, and wherein the first processing unit to bypass a supervisor level validation of each user level thread to signal the second processing unit to execute the event is to:
bypass the supervisor level validation of each user level thread to signal the second processing unit to execute the event by setting the first indicator of each user level thread in response to each user level thread having the event to be enqueued for the second processing unit;
set each of a plurality of second indicators based on each corresponding first indicator of each user level thread;
select one of the plurality of second indicators;
determine an identification (ID) of the user level thread associated with the selected second indicator; and
store the ID of the user level thread associated with the selected second indicator into a queue.

12. The apparatus of claim 11, wherein the first processing unit is further to:
generate an interrupt for the second processing module, wherein the interrupt is to indicate that the queue is not empty.

13. The apparatus of claim 11, wherein the first processing unit is further to:
clear the selected second indicator in response to storing the ID of the user level thread into the queue.

14. The apparatus of claim 11, wherein the first processing unit to select one of the plurality of second indicators is to select one of the plurality of second indicators based on one of a priority or a least recently use (LSU) criterion of the plurality of second indicators.

15. The apparatus of claim 11, wherein the first processing unit is further to assert an enable signal associated with the selected second indicator, and wherein the first processing unit to select one of the plurality of second indicators is to select one of the plurality of second indicators in response to the assertion of the enable signal associated with the selected second indicator.

16. The apparatus of claim 11, wherein the plurality of second indicators are public doorbells, wherein each first indicator is a mapped doorbell in a virtual address space of each user level thread associated with each respective public doorbell.

17. The apparatus of claim 16, wherein the public doorbells are part of a last level cache memory hierarchy accessible as a cache memory client by the first and the second processing module.

18. A method comprising:
executing one or more user level applications in a first processing unit, wherein each user level application is to offload a task to a second processing unit wherein each user level application has a first indicator;
signaling the second processing unit to handle the task from each user level application while maintaining a privilege level of each user level application by setting the first indicator of each user level application in response to each user level application having the task to be offloaded to the second processing unit;
setting each of a plurality of second indicators based on each corresponding first indicator of each user level application;
selecting one of the plurality of second indicators;
determining an identification (ID) of the user level application associated with the first selected second indicator; and
storing the ID of the user level application into a first in first out (FIFO) queue.

19. The method of claim 18, further comprising:
generating an interrupt for the second processing unit, wherein the interrupt is to indicate that the FIFO queue is not empty; and
clearing the selected second indicator in response to storing the ID of the user level application into the FIFO queue.

20. The method of claim 18, wherein selecting one of the plurality of second indicators comprises selecting one of the plurality of second indicators based on one of a priority or a least recently use (LSU) criterion of the plurality of second indicators.

21. The method of claim 18, further comprising asserting an enable signal associated with the selected second indicator, and wherein selecting one of the plurality of second indicators comprises selecting one of the plurality of second indicators in response to the assertion of the enable signal associated with the selected second indicator.

* * * * *